United States Patent
Takezawa et al.

(10) Patent No.: US 6,495,247 B1
(45) Date of Patent: Dec. 17, 2002

(54) FUNCTIONAL MEMBER HAVING MOLECULAR LAYER ON ITS SURFACE AND METHOD OF PRODUCING THE SAME

(75) Inventors: Hiroaki Takezawa, Nara (JP); Tadashi Otake, Neyagawa (JP); Yasuo Takebe, Katano (JP); Hiroshi Onishi, Hirakata (JP); Norihisa Mino, Nara (JP); Toru Shiino, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/125,622

(22) PCT Filed: Dec. 11, 1997

(86) PCT No.: PCT/JP97/04558

§ 371 (c)(1),
(2), (4) Date: Aug. 21, 1999

(87) PCT Pub. No.: WO98/29244

PCT Pub. Date: Jul. 9, 1998

(30) Foreign Application Priority Data

Dec. 27, 1996 (JP) .............................. 8-349871

(51) Int. Cl.$^7$ ................................ B32B 5/16
(52) U.S. Cl. .................... 428/220; 427/352; 427/388.2; 427/409; 427/457; 428/338; 428/339; 428/457; 428/458

(58) Field of Search ................................. 428/220, 333, 428/338, 339, 411.1, 457, 458; 427/352, 388.2, 409, 457

(56) References Cited

U.S. PATENT DOCUMENTS

| | | | | |
|---|---|---|---|---|
| 4,169,904 A | * | 10/1979 | Czornyj et al. | ................ 427/44 |
| 5,173,365 A | * | 12/1992 | Singh et al. | ................ 428/333 |
| 5,925,417 A | * | 7/1999 | Fousse | ........................ 427/352 |

FOREIGN PATENT DOCUMENTS

| | | |
|---|---|---|
| EP | 0 849 003 A1 | 6/1998 |
| JP | 61-179791 | 8/1986 |
| JP | 7-197021 | 8/1995 |
| WO | 94/21386 | 9/1994 |

* cited by examiner

*Primary Examiner*—H. Thi Le
(74) *Attorney, Agent, or Firm*—Wenderoth, Lind & Ponack, L.L.P.

(57) ABSTRACT

A functional member having a molecular layer on its surface, wherein the molecular layer is formed through a coordinate bond, and the coordinate bond is a multidentate bond in which at least one molecule is bonded to one metallic atom of the member and two or more ligands of the molecule are coordinated.

40 Claims, No Drawings

FUNCTIONAL MEMBER HAVING MOLECULAR LAYER ON ITS SURFACE AND METHOD OF PRODUCING THE SAME

BACKGROUND OF THE INVENTION

1. Field of the Invention

The present invention relates to a functional member having a molecular layer on its surface and, more particularly, to a functional member having a molecular layer formed to coordinate on its surface, and a method of producing the same.

2. Description of the Related Art

Currently, as methods for formation of a molecular layer, there are known a so-called LB method and a chemical adsorption method (K. Ogawa et al., Langnuir, 6,851 (1990)).

The LB method is a method such that amphiphatic molecules developed on a water surface are collected together, with pressure being applied to the molecules in a direction parallel to the water surface, the molecules being then scooped onto a substrate while the pressure is kept constant, whereby a monomolecular layer is formed.

In the chemical adsorption method, a silane-based surface active agent is mainly used in such a way that the surface active agent is caused to go into condensation reaction with functional groups having active hydrogen, such as hydroxyl group and carboxyl group, which are present on the substrate, whereby a monomolecular layer of the silane-based surface active agent is formed on the substrate.

However, the above mentioned forming methods each have problems yet to be solved.

The LB method requires the provision of a developing bath first of all. The developing bath must be protected against vibration so that any slight vibration in the surroundings will not be transferred to the bath to cause the liquid surface to become wavy.

Another problem with the LB method is that since a molecular layer prepared by the LB method is fixed to the substrate by ionic bonding, the layer will be easily peeled off not only by a mechanical scratch, but also by being merely brought into contact with a liquid.

Whilst, the chemical adsorption method involves a problem that hydrogen chloride is produced because the silane-based surface active agent is brought into condensation reaction with a functional group having an active hydrogen atom as already mentioned. Therefore, the chemical adsorption method may be unsuitable for use with a substrate having low acid resistance.

Another problem with this method is that the silane-based surface active agent will not go into condensation reaction with a substrate having no active hydrogen atom; therefore, it is impossible to carry out layer-forming by using such a method.

The present invention has been developed in view of above mentioned state of the art and, therefore, it is an object of the invention to provide a method of forming on the surface of a substrate a molecular layer which involves no such problems mentioned above as have been encountered in the prior art.

It is another object of the invention to provide a novel functional material having a molecular layer firmly bonded to the surface of a component member.

SUMMARY OF THE INVENTION

Therefore, the present invention relates to a functional member having a molecular layer on its surface, wherein the molecular layer is a layer formed on the surface of the member through a coordinate bond, the coordinate bond being a multidentate bond such that at least one molecule is in bond with one metallic atom of the member, and such that two or more ligand atoms of the molecule are coordinated so that the metallic atom is placed between the ligand atoms. The invention also relates to a method of producing the functional member.

DESCRIPTION OF THE PREFERRED EMBODIMENTS

A multidentate bond wherein multidentate ligand molecules are in bond with atoms of a substrate metal is known as a chelate bond. A chelate bond is different from a covalent bond in the way in which the bond is formed, but the formed bond per se is same as the covalent bond. In a coordinate bond, both electrons that form the bond come from one of the atoms. Although the bond is covalent in character, a coordinate bond differs from a covalent bond in the origin of the electrons that form the bond. In a covalent bond, one electron originates on each of the two atoms being bonded. Therefore, the multidentate bond provides much higher layer/substrate metal bond strength than a monodentate bond, and accordingly the molecular layer formed can exhibit good performance characteristics, such as high heat resistance. Further, characteristic features of such multidentate ligand molecules can be advantageously utilized in providing the member with various properties, such as insulating property, electrical conductivity, permeability, bonding property, absorption characteristic, and protective property.

Multidentate ligand molecules usable for forming a molecular layer in the present invention include, for example, acetylacetone, acetoethyl acetate, benzoyl acetone, ethylenediamine, diethylenetriamine, triethylenetetramine, diethylamine, thiourea, diethanolamine, triethanolamine, iminodiacetic acid, nitrilotriacetic acid, ethylenediamine tetraacetic acid, quinoline-8-carboxylic acid, quinaldinic acid, o-aminobenzoic acid, oxalic acid, malonic acid, succinic acid, adipic acid, maleic acid, fumaric acid, anthranilic acid, 2-aminoperimidine, galloyl-gallic acid, potassium xanthate, oxine, cupferron, 4-chloro-3-methyl-5-nitrobenzene sulfonate, salicylaldehyde oxime, diantipyrylmethane, diethyl dithiocarbamic acid, p-dimethylamino benzylidene rhodamine, dimethylglyoxime, cinchonine, N-cinnamoyl-N-phenylhydroxylamine, thioacetoamide, thionalide, tetraphenyl borate, trimethylphenyl ammonium, 1-nitroso-2-naphthol, nitrone, neocupferron, bismuthyol II, p-hydroxyphenyl arsonic acid, 8-hydroxy-7-iodo-5-quinoline sulfonic acid, pyrogallol, 1-pyrrolidine carbodithioic acid, phenylarsonic acid,(phenylthio) dantinic acid, phenylfluoron, α-furyldioxime, brucine, benzidine, N-benzoyl-N-phenylhydroxylamine, α-benzoin oxime, benzo[f] quinoline, 2-mercaptobenzothiazole, rhodamine B, 4-tetradecyl-N-methyl salicylaldehyde oxime, 3-tetradecyl pyridine, itaconic acid, and pyromellitic acid.

For use as a component member on which a molecular layer is to be formed in accordance with the present invention, materials having a metallic portion or metallic oxide portion exposed on the surface are most suitable. The member may be in the form of a metallic plate or a material such that a metallic component is dispersed in resin and is contained as a part of the surface component. There is no particular limitation with respect to the configuration and size of the substrate.

In order to form a multidentate bond with a multidentatable molecule, it is necessary that the coordination number of atoms of the component metal should be two or more. Where the coordination number of such atoms is four or more, multidentate molecules which are in bond with one metallic atom may be two or more in number. For example, when the component metal is copper, the coordination number is 2 or 4; when the metal is nickel, the coordination number is 4 or 6; when cobalt, the coordination number is 4 or 6; when silver, the number is 2 or 4; if gold, the number is 4; when platinum, the number is 4 or 6; when aluminum, the number is 6; and in the case of tungsten, the number is 6 or 8.

To form a molecular layer on the surface of the component member, multidentate molecules may be brought into contact with the member. For causing such a molecule to contact the member, a suitable method is to bring the substrate into contact with one of a liquid molecule, a liquid solution having molecules dissolved in a solvent, and a gaseous molecule.

In particular, when a liquid solution is used, it is necessary to suitably select a solvent which will not affect the substrate on which a layer is to be formed. For example, water, alcohols, and ketones are most suitable for this purpose.

The variation of characteristics of a molecular layer and/or the control of molecular layer thickness may be adjusted depending on the kind of multidentate molecules and conditions used for causing the substrate into contact with the multidentate molecule.

In order to enable the formation of a strong chelate bond of the multidentate molecule with the component member to provide a molecular layer having high heat resistance, it is preferable that the molecule should be a molecule having not less than two functional groups selected from carboxyl groups, amino groups, and hydroxyl groups, including, for example, ethylenediamine, diethylenetriamine, triethylenetetramine, diethylamine, diethanolamine, triethanolamine, imino-diacetic acid, nitrilotriacetic acid, ethylenediamine-tetraacetic acid, quinoline-8-carboxylic acid, quinaldinic acid, o-aminobenzoic acid, oxalic acid, malonic acid, succinic acid, adipic acid, maleic acid, fumaric acid, anthranilic acid, galloyl-gallic acid, pyrogallol. By using such a multidentate molecule to form such a chelate bond of the molecule with the component member as represented by the formula (1) below is it possible to realize the formation of aforesaid molecular layer:

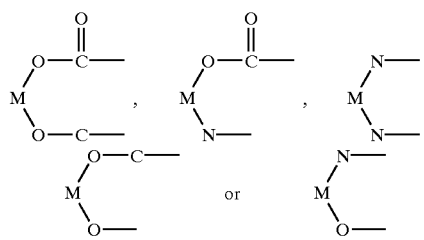

(1)

(in which, M represents a metallic atom of the substrate).

The shorter the time for contact between the component member and the ligand molecule, and the lower the probability of such a contact, the smaller is the thickness of the molecular layer formed. Conversely, the longer the time for contact between the component member and the ligand molecule, and the higher the probability of such a contact, the larger is the thickness of the molecular layer formed. In order to form a multimolecular layer more efficiently and in sufficient thickness, it is desirable that a ligand molecule capable of dissolving the metal of the component member is preferably used.

In order to form a monomolecular layer, a component member is treated (immersed) in a ligand molecule solution having a concentration of the order of 0.1 mmol/L to 500 mmol/L under temperature conditions of more than the melting point but lower than boiling point of a solvent used and for not more than 24 hours, preferably at a temperature of 0 to 100° C. for 1 to 60 minutes, more preferably at a temperature of room temperature (24° C.) order for about 10 minutes, whereby a molecular layer comprised of a monomolecular layer can be formed on the surface of the component member.

Multidentate molecules which can be preferably used in forming such a monomolecular layer are exemplified by molecules comprising functional groups expressed by the following formula (2):

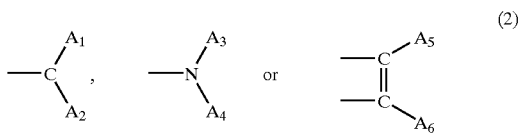

(2)

In the formula (2), $A_1$–$A_6$ denote $(CH_2)_n COOH$ (n is 0–3), $(CH_2)_n OH$ (n is 0–3), or $(CH_2)_m NXY$ (m is 0–2; X and Y independently represent a hydrogen atom, a hydrocarbon group having not more than 8 carbon atoms, a phenyl group or an aromatic ring group having one or more hydrocarbon group having not more than 8 carbon atoms). The double bond in the formula (2) may be a part of a benzene ring or other aromatic ring.

Specifically preferred as such molecules are, for example, ethylene diamine, diethylene triamine, triethylene tetramine, diethyl amine, diethanol amine, triethanol amine, iminodiacetic acid, nitrilo-triacetic acid, ethylenediamine tetraacetic acid, o-aminobenzoic acid, oxalic acid, malonic acid, succinic acid, adipic acid, maleic acid, and fumaric acid. Among them, o-aminobenzoic acid is preferred.

When a monomolecular layer is formed, the use of a modified coordination molecule assures more accurate formation of the monomolecular layer because such a molecule is less liable to be influenced by manufacturing conditions. Usable as such molecules are, for example, anthranilic aid, itaconic acid, or pyromellitic acid, incorporating a substituent group which will not interact with metal, such as an alkyl group of the C3–C22 order, as expressed by the following formula (3):

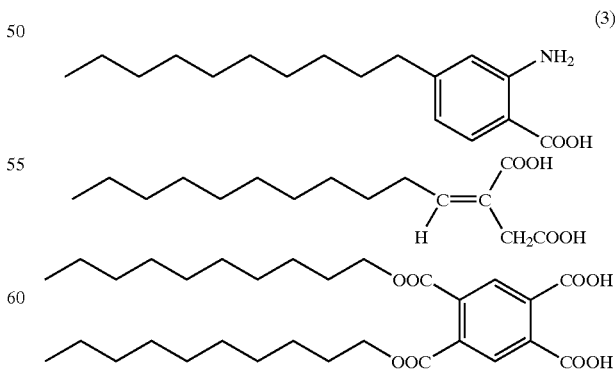

(3)

anthranilic acid or itaconic acid incorporating a fluoroalkyl group of the C1–C18 order which will not interact with metal, as expressed by the following formula (4):

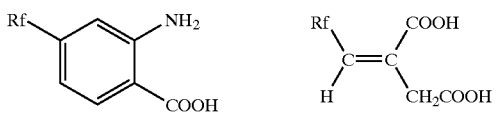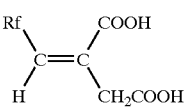

(4)

; or anthranilic acid or itaconic acid incorporating a bulky substituent such as a t-butyl group or a polycyclic aromatic group or the like, as expressed by the following formula (5):

(5)

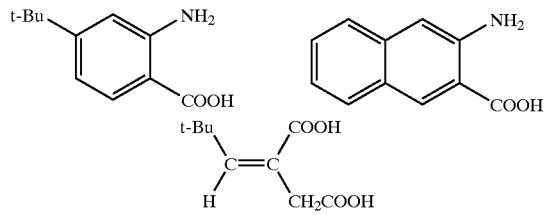

For forming a multimolecular layer, the ligand molecule solution is preferably treated under temperature conditions of more than the melting point but lower than boiling point of a solvent used and for a time period of 10 minutes to 48 hours, preferably at a temperature from room temperature to less than the boiling point for 10 minutes to 24 hours, more preferably at a temperature adjacent to room temperature for 10 to 40 minutes, whereby a molecular layer comprised of a multimolecular layer can be formed on the surface of the component member.

In the present invention, a molecular layer is formed on the surface of component member. This makes it possible to give a functional member provided on its surface with functional properties which coordinated molecules possess.

For example, it is possible to provide an electrically conductive component member with electrical insulating properties. If the conductive component member can be provided with electrical insulating properties on its surface in a molecular level thickness, it is possible to meet contemporary needs for size and thickness reduction with respect to electronic components. More especially, with respect to coils for transformers, motors and the like which take a particularly large part in volume and weight among various electronic components, size and thickness reduction is a current universal requirement yet to be met.

Generally, a coil is such that for securing the insulation between adjacent wires in the coil, the wires are coated with a resin material, such as enamel. The electromotive force of the coil is proportional to the number of turns of the winding. In order to increase the number of turns of the winding for a given volume, a high-performance winding machine has been employed to carry out high-density winding. However, since the thickness of resin material, such as enamel, used for coating the wires is so thick, i.e., on the order of 10 to 50 μm, and since the electromotive force of the coil is proportional to the number of turns of the winding, attempts have been made to reduce the size of the coil and also to reduce the thickness of resin coating, such as of enamel, in order to increase the electromotive force of the coil. However, any further thickness reduction of the enamel coating has been found difficult because such thickness reduction would possibly lead to dielectric breakdown due to pin holes, and this has been a great hindrance to coil size reduction and/or electromotive force increase.

With the development of high-density packaging techniques for circuit boards, boards having adjacent conductors arranged in a very narrow spaced relation have been fabricated. In order to insure inter-wire insulation, it has been general practice that as the spacing between adjacent conductor electrodes becomes narrower, any conductor metal surface of the circuit board which requires protection from moisture is coated with a resin material, such as urethane resin or acrylic resin. However, in order to insure good insulation with respect to the circuit board, it has been necessary to coat the conductor metal surface of the board with a urethane resin, acrylic resin, or the like which has good moisture-proofing characteristics to a thickness of 100 μm or more, or in some cases to a thickness of 10 mm or more. This has made it difficult to achieve size reduction and thickness reduction with respect to circuit boards.

The application of the present invention makes it possible to reduce the thickness of an insulating layer on a metal surface of coil wiring and/or of a circuit board, thus achieving a breakthrough size reduction and thickness reduction with respect to electronic components.

In this way, where the provision of a functional member having electrical insulation characteristics for use in electronic parts is intended, a water-insoluble and electrically insulative multidentate molecular layer is formed on the surface of an electrically conductive member to which insulation characteristics are to be imparted. The molecular layer so formed will not be elated by water even under high temperature conditions and will not be degraded in its insulating properties. The molecular layer is very thin because of a molecular level thickness. Therefore, a very thin insulating layer, which is far much thinner than any conventionally made insulating layer, can be formed on the surface of a conductive component.

Multidentate ligand molecules preferred for use in forming a water-insoluble and electrically insulative complex-molecular layer on the surface of a conductive component include, for example, anthranilic acid, 2-aminoperimidine, galloyl-gallic acid, potassium xanthate, oxine, quinaldinic acid, cupferron, 4-chloro-3-methyl-5-nitrobenzene sulfonate, salicylaldehyde oxime, diantipyrylmethane, diethyl dithiocarbamic acid, p-dimethylamino benzylidene rhodamine, dimethylglyoxime, oxalic acid, cinchonine, N-cinnamoyl-N-phenylhydroxylamine, thioacetoamide, thionalide, thiourea, tetraphenyl borate, trimethylphenyl ammonium, 1-nitroso-2-naphthol, nitrone, neocupferron, bismuthyol II, p-hydroxyphenyl arsonic acid, 8-hydroxy-7-iodo-5-quinoline sulfonic acid, pyrogallol, 1-pyrrolidine carbodithioic acid, phenylarsonic acid, phenylthiodantinic acid, phenylfluoron, a-furyldioxime, brucine, benzidine, N-benzoyl-N-phenylhydroxylamine, a-benzoin oxime, benzo[f] quinoline, 2-mercaptobenzothiazole, rhodamine B, and quinoline-8-carboxylic acid. Among these compounds, oxine, cupferron, oxalic acid, anthranilic acid, quinaldinic acid, and quinoline-8-carboxylic acid are preferred.

The multidentate ligand molecules preferably include at least a multidentate ligand molecule which can form on the surface of a conductive component a water-insoluble and electrically insulative complex molecular layer, and which can dissolve an oxide layer on the surface of the conductive component. This makes it possible to provide an insulation layer which is much thinner than any conventionally produced insulation layer and, in addition, is formed in uniform thickness. Usually, the metal surface has a spontaneous oxide layer formed thereon, so that there is low possibility of the metal itself being exposed on the surface. Multidentate ligand molecules will readily react with metal itself and metallic ions, but will not easily react with metal in oxidized condition. Therefore, the oxide layer is dissolved to cause metal exposure, and metal of the oxide layer are ionized to react with multidentate ligand molecules. It becomes possible to form a complex molecular layer to give a more uniform insulation layer.

Preferred multidentate ligand molecules which are capable of dissolving an oxide layer on the surface of a conductor material and forming a water-insoluble and electrically insulative complex molecular layer are exemplified by oxalic acid, anthranilic acid, galloyl-gallic acid, quinaldinic acid, quinoline-8-carboxylic acid, thiourea, pyrogallol, phenylfluorone, 4-chloro-3-methyl-5-nitrobenzene sulfonate, and Rhodamine B. Among of these compounds, oxalic acid, anthranilic acid, quinaldinic acid, and quinoline-8-carboxylic acid are preferred inter alia.

An oxide layer on the surface of a conductive material is made thicker by previously heat-treating the material. The use of a multidentate ligand molecule capable of dissolving an oxide layer as an insulation treatment agent can bring about an increase in the number of metallic ions which react with the multidentate ligand molecule. Therefore, the complex molecular layer becomes thicker in proportion to the thickness of the oxide layer. This correlation between the thickness of the oxide layer and the thickness of the complex molecular layer provides an advantage such that by selecting conditions for metal pretreatment it is possible to control the thickness of the insulating layer to be obtained.

When imparting electrically insulating characteristics to a conductive component, it is possible to control the thickness of the molecular layer to be formed within a thickness range of from a ultra-thin monomolecular layer level to the order of about 5 to 6 $\mu$m by adjusting various conditions, such as temperature, treatment time period, and heat treatment. For example, a molecular layer of about 3 $\mu$m in thickness can be formed under operating conditions of immersion for 10 to 40 minutes at room temperature and drying at 100° C. for 30 minutes; and a molecular layer of about 5 $\mu$m in thickness can be formed under operating conditions of prior heat treatment of the substrate at 100° C. for 10 minutes, immersion at room temperature for 10 to 40 minutes, and drying at 100° C. for 30 minutes.

When a copper wire for coil is used as conductive member in forming such an electrically insulating molecular layer, size reduction can be enhanced with respect to transformers, motors, and the like. At the same time, costs involved in moisture-proof coating and the like can be substantially reduced.

The present invention is applicable for use in circuit board insulation techniques by using as a solvent for insulation treatment a solvent which is not detrimental to resin material of circuit boards and the like. Further, when a circuit board with respect to which device soldering has been completed is immersed in an insulation treatment agent and then dried, only metallic portions of the circuit board, such as conductor metal, solder coating, and leads, are treated for insulation without involving such a problem as resin deterioration or the like. Therefore, the invention enables easy insulation treatment of circuit boards with soldered device.

When insulation treatment is intended, the solvent to be used is easy to dry after complex formation and not detrimental to the resin used for the circuit board. Therefore, suitable for use as such a solvent are water and at least one kind of material selected from the group consisting of monovalent alcohols having not more than 4 carbon atoms, such as ethyl alcohol, isopropyl alcohol, and butyl alcohol. A monovalent alcohol having 5 or more carbon atoms has a high boiling point. Such a monovalent alcohol is hard to evaporate during the process of insulation treatment, and therefore it remains on the metal surface after insulation treatment, which leads to poor insulating performance. Therefore, such a monovalent alcohol is not suitable for use. In the foregoing respect, the invention also substantially contributes toward size and thickness reduction of circuit boards and can substantially reduce costs which may otherwise be involved in moisture-proof coating, etc.

When 4-tetradecyl-N-methylsalicylaldehyde oxime, 3-tetradecyl bipyridine, 4-pentylanthranilic acid, 2-heptafluoroethynyl itaconic acid, or the like is used in forming a molecular layer on the surface of a component, water-repellent or rust-proofing characteristics can be imparted to the component.

The following examples are given to further illustrate the present invention.

EXAMPLE 1

An insulation treatment solution was prepared by dissolving 5 parts by weight of oxine in a mixture solvent of 50 parts by weight of water and 50 parts by weight of isopropyl alcohol. Copper wires of 0.5 mm in diameter and about 15 m in length were immersed in the insulation treatment solution at a room temperature of 24° C. for 30 minutes in such a way as to avoid contact of individual copper wires with one another. Thereafter, the copper wires were taken out and dried at 100° C. for 15 minutes. Thus, an insulating layer was formed on the copper wires.

Copper wires on which an insulating layer was formed were wound about an iron core 1 of 10 mm in diameter and 100 mm in length, with no clearance left and surplus wire portions cut off, Thus, a solenoid coil was made.

The thickness of the insulating layer on the copper wire was measured by using a surface roughness meter, and then the insulation resistance between a copper wire cut end and an iron core end was measured in accordance with the insulation resistance test method provided in JIS C4552 (insulation resistance test 1).

The coil was put in a thermohygrostat at a temperature of 60° C. and a humidity of 90% RH, and the insulation resistance between the copper wire cut end and the iron core end was measured in accordance with the insulation resistance test method provided in JIS C4552 (insulation resistance test 2).

In Example 1, both insulation resistance test 1 and insulation resistance test 2 showed good measurement results, and the solenoid coil, under both room temperature and thermohygrostatic conditions, exhibited good insulating characteristic comparable to that of a conventional enamel-coated solenoid coil (coating thickness: 30 $\mu$m) shown as Comparative Example 3.

Although a mixture solution of water and isopropyl alcohol was used as a solvent for the insulation treatment agent in Example 1, hydrocarbons, ketones, ethers, esters, other monohydric alcohols, dihydric alcohols, and glycol ethers may be used as such.

For the composition of the insulation treatment agent, the proportion of the chelating agent was 5 parts by weight relative to 100 parts by weight of the solvent; however, as long as the proportion is virtually 5 parts by weight or more, the function required of the chelating agent in the present method is sufficiently met. More than 5 parts by weight of such agent poses no problem.

EXAMPLE 2

Cupferron was used as a chelating agent for insulation treatment in place of the chelating agent used in Example 1. The test results obtained were equivalent to those of Example 1.

As shown in Comparative Example 1, when no insulation treatment was carried out, both insulation resistance test 1 and insurance test 2 witnessed degradation in insulating characteristics such that the coil was totally unusable as such.

EXAMPLE 3

Copper wires were previously heat treated at 100° C. for 10 minutes to thereby increase a thickness of oxide layer. Then, insulation treatment was carried out using the same insulation treatment agent as used in Example 1. As a result, there was an increase in thickness of the complex layer as compared with Example 1 in which no pretreatment was carried out. This resulted in improved insulation performance at room temperature. Further, it was found that there was a correlation between the thickness of an oxide layer and the thickness of a complex layer. This tells that the thickness of the insulating layer can be controlled by changing the conditions for pretreatment.

EXAMPLE 4

Insulation treatment was carried out using oxalic acid, which is capable of dissolving an oxide layer on a metallic surface, in place of the chelating agent of Example 1. Both insulation test 1 and insulation test 2 showed good results such that a satisfactory insulation characteristic was exhibited which was equivalent to that of Comparative Example under both room temperature and thermo-hygrostatic conditions. Further, there was an improvement made in insulation performance at room temperature, as compared with Examples 1 and 2 wherein the chelating agent used was incapable of dissolving an oxide layer on a metallic surface.

EXAMPLE 5

Anthranilic acid, an acid capable of dissolving an oxide layer on a metallic surface, was used in place of the chelating agent of Example 1. Test results obtained were equivalent to those of Example 4.

EXAMPLE 6

Quinaldinic acid, an acid capable of dissolving an oxide layer on a metallic surface, was used in place of the chelating agent of Example 1. Test results obtained were equivalent to those of Example 4.

EXAMPLE 7

Quinoline-8-carboxylic acid, an acid capable of dissolving an oxide layer on a metallic surface, was used in place of the chelating agent of Example 1. Test results obtained were equivalent to those of Example 4.

Not illustrated as an Example, though, galloyl gallic acid, thiourea, pyrogallol, phenylfluorone, 4-chloro-3-methyl-5-nitrobenzene sulfonate, and Rhodamine B were each used as a chelating agent in the insulation treatment solution. Test results obtained were equivalent to those obtained with respect to Examples 4 to 7.

As shown in Comparative Example 2, when iminodiacetic acid, an acid capable of dissolving an oxide layer on a metal surface but reactive with metal to form a water-soluble complex, was used as a chelating agent of the insulation treatment solution, both insulation resistance test 1 and insulation resistance test 2 showed unfavorable results such that the insulation performance under both room temperature and thermo-hygrostatic conditions was inferior as compared with Examples 4 through 7 and Comparative Example 3.

EXAMPLE 8

Copper wires were previously heat treated at 100° C. for 10 minutes to thereby increase a thickness of oxide layer. Insulation treatment was carried out using the same insulation treatment agent as used in Example 4. As a result, there was an increase in thickness of the complex layer as compared with Example 4 in which no pretreatment was carried out. This resulted in improved insulation performance under thermo-hygrostatic conditions. Thus, good insulating characteristics were exhibited under both room temperature and thermo-hygrostatic conditions. Further, it was found that there was a correlation between the thickness of an oxide layer and the thickness of a complex layer. This tells that the thickness of the insulating layer can be controlled by changing the conditions for pretreatment.

Not illustrated as an Example, though, anthranilic acid, quinaldinic acid, quinoline-8-carboxylic acid, galloyl gallic acid, thiourea, pyrogallol, phenylfluorone, 4-chloro-3-methyl-5-nitrobenzene sulfonate, and Rhodamine B were used as a chelating agent in the insulation treatment solution. Favorable results were obtained which were equivalent to those obtained with respect to Example 8.

A comparison of Examples 1 to 8 with Comparative Example 3 shows that whereas the number of coil copper wire turns in Comparative Example is 167, the number of coil copper wire turns in Examples 1 to 8 is about 200. This tells that in Examples 1 to 8, a copper wire of a larger length, or about 20% longer, was wound on an iron core of a specified length. That is, the insulating layer formed on the copper wire of Examples 1 to 8 each was far much thinner than any conventional enamel coated wire. Among Examples 1 to 8, Example 8 exhibited most favorable insulating characteristic. Therefore, Example 8 is considered to be the most preferred Example of the present invention.

Insulation resistance values obtained in insulation resistance tests 1 and 2 were evaluated in accordance with the judgement criteria shown. Evaluations with respect to Examples 2 to 8 are shown, together with evaluations of Comparative Examples 1 to 3, in Table 1. The number of copper wire turns are also shown in Table 1.

TABLE 1

| Ex. | Chelating agent | Copper wire pretreat conditions | Insulating layer thickness ($\mu$m) | Number of Copper wire turns | Test results 1 | 2 |
|---|---|---|---|---|---|---|
| 1 | oxine | — | 3.0 | 198 | ○ | ○ |
| 2 | cupferron | — | 3.0 | 196 | ○ | ○ |
| 3 | oxine | 100° C. 10 min. | 4.5 | 196 | ● | ○ |
| Comp. Ex. 1 | without insulation treatment | | 0 | 197 | x | x |
| 4 | oxalic acid | — | 4.0 | 197 | ● | ○ |
| 5 | anthranilic acid | — | 4.0 | 197 | ● | ○ |
| 6 | quinaldinic acid | — | 4.5 | 196 | ● | ○ |
| 7 | quinoline-8-carboxylic acid | — | 4.5 | 197 | ● | ○ |
| 8 | oxalic acid | 100° C. 10 min. | 5.5 | 196 | ● | ● |
| Comp. Ex. 2 | iminodiacetic acid | — | 3.5 | 196 | ○ | x |

TABLE 1-continued

| Ex. | Chelating agent | Copper wire pretreat conditions | Insulating layer thickness ($\mu$m) | Number of Copper wire turns | Test results 1 | 2 |
|---|---|---|---|---|---|---|
| Comp. Ex. 3 | without insulation treatment (enamel) | — | 30 | 167 | o | o |

1: Insulation resistance test 1
2: Insulation resistance test 2
Judgement criteria:
●: Insulation resistance is 30 M$\Omega$ or more.
o: Insulation resistance is 20 M$\Omega$ or more.
x: Insulation resistance is less than 20 M$\Omega$.

EXAMPLE 9

An insulation treatment solution was prepared by dissolving 5 parts by weight of oxalic acid in a mixture solution of 50 parts by weight of isopropyl alcohol and 50 parts by weight of water. A circuit board for evaluation as defined by JIS 2 type, was immersed in the insulation treatment solution at room temperature (24° C.) for 30 minutes. After having been taken out, the board was dried at 100° C. for 15 minutes to thereby form an insulating layer on comb-like copper electrode portions of the circuit board for evaluation.

The circuit board has comb-like electrodes provided on an insulating substrate.

With respect to the evaluation-purpose circuit board treated for insulation in this way, the thickness of the insulating layer on the electrodes was measured by using a surface roughness meter. Then, the board was placed in a thermo-hygrostat tank at a temperature of 60° C. and a humidity of 95% RH, and an insulation resistance test was carried out for measuring the insulation resistance between terminal and terminal under a voltage of DC 50 V applied for 1000 hours. Insulation resistance values obtained in the insulation resistance tests were evaluated in accordance with the judgement criteria shown. The evaluation results are shown in Table 2, together with other particulars of Examples 10 to 12 and Comparative Examples 4 to 6.

TABLE 2

| | Chelating agent (5 wt parts) | Solvent (total 100 wt parts) | Substrate pretreat conditions | Insulating layer thickness ($\mu$m) | Resistance test result |
|---|---|---|---|---|---|
| Ex. | | | | | |
| 9 | oxalic acid | IPA + water | — | 3.0 | o |
| 10 | oxalic acid | IPA | — | 3.0 | o |
| 11 | oxalic acid | ethyl alcohol | — | 3.0 | o |
| 12 | oxalic acid | IPA + water | 100° C. 10 min. | 4.5 | ● |
| Comp. Ex. | | | | | |
| 4 | without insulation treatment | — | — | — | x |
| 5 | oxalic acid | hexyl alcohol | 100° C. 10 min. | 4.5 | — |
| 6 | without insulation treatment (urethane coating) | | | 10000 | ● |

IPA: isopropyl alcohol
Judgement criteria:
●: Insulation resistance is constantly $10^{10}$ $\Omega$ or more
o: Insulation resistance is $10^9$ $\Omega$ or more, but is lowered to less than $10^{10}$ $\Omega$.
x: Insulation resistance is lowered to less than $10^9$ $\Omega$.

As can be seen from Comparative Example 4, the circuit board for evaluation, with no insulation treatment made, suffered from degradation in insulating characteristic. In contrast, Example 9 exhibited good insulating performance equivalent to that of Comparative Example 6 in which a moisture proof coating of urethane resin was applied without any insulating treatment. The mixture solvent composed of 50 parts by weight of isopropyl alcohol and 50 parts by weight of water which was used as a solvent for the insulation treatment solution did not affect the resin, resist, etc. used for the circuit board. Any appearance change, such as resin degradation, did not occur even after insulation treatment.

EXAMPLE 10

Isopropyl alcohol was used as a solvent of the insulation treatment solution under the same conditions as in Example 9. The test result obtained was equivalent to that of Example 9.

EXAMPLE 11

Ethyl alcohol was used as a solvent of the insulation treatment solution under the same conditions as in Example 9 The test result obtained was equivalent to that of Example 9.

Although a mixture solution of 50 parts by weight of isopropyl alcohol and 50 parts by weight of water, or 100 parts by weight of isopropyl alcohol or 100 parts by weight of ethyl alcohol were used as a solvent of the chelating agent in the insulation treatment solution, it is only required that the solvent should not affect the resin and should not remain on any metallic portion after insulation treatment. Therefore, other solvent,such as butyl alcohol, may beused as a solvent. However, a morovalent alcohol having 5 or more carbon atoms is not suitable because it has a high boiling point and will remain on metal surface after insulation treatment. In the composition of the insulation treatment solution, the proportion of the chelating agent was 5 parts by weight relative to 100 parts by weight of total solvent in Example 9. As long as the proportion is virtually 5 parts by weight or more, the function required of such agent in the method of the invention can be fully met. More than 5 parts by weight of such agent poses no problem.

In Examples 9 to 11, oxalic acid was used as a chelating agent in the insulation treatment solution. When anthranilic acid, quinaldinic acid, quinoline-8-carboxylic acid, galloyl gallic acid, thiourea, pyrogallol, phenylfluorone, 4-chloro-3-methyl-5-nitrobenzene sulfonate, and Rhodamine B were used as a chelating agent in the insulation treatment solution, good results comparable to those in Examples 9 to 11 were obtained.

Next, with respect to a circuit board which was prepared by soldering a resistor of 10 kΩ between terminal and terminal on a board then treating the board for insulation according to the method employed in Examples 9 to 11, an insulation resistance test was carried out which gave same test results as obtained in Examples 9 to 11. No problem was found in respect of either insulating performance or exterior appearance. There was no burn-out problem with respect to the soldered resistor or the like. It was thus found that the method of Examples 9 to 11 would be applicable to circuit boards which had been loaded with devices.

EXAMPLE 12

A circuit board was previously heat treated at 100° C. for 10 minutes to thereby increase the thickness of an oxide layer. Thereafter, insulating treatment was carried out using the same insulation treatment composition as used in Example 9. As a result, there was an increase in thickness of the insulating layer as compared with Example 9 in which no pretreatment was carried out. This resulted in further improvement in insulating performance. There was no change in the exterior appearance of the circuit board after insulation treatment.

While a mixture solvent of isopropyl alcohol and water was used as a solvent in the insulation treatment solution in Example 12, the use of solvents, such as water, isopropyl alcohol, ethyl alcohol, and butyl alcohol, demonstrated the same effect as obtained in Example 12. As shown in Comparative Example 5, however, where a hexyl alcohol or a monohydric alcohol having 5 carbon atoms, was used as a solvent in the insulation treatment solution, a solvent residue remained on the circuit board after insulation treatment, resulting in insulating property degradation.

In Example 12, oxalic acid was used as a chelating agent in the insulation treatment solution. When anthranilic acid, quinaldinic acid, quinoline-8-carboxylic acid, galloyl gallic acid, thiourea, pyrogallol, phenylfluorone, 4-chloro-3-methyl-5-nitrobenzene sulfonate, and Rhodamine B were used as a chelating agent in the insulation treatment solution, good results comparable to those in Example 12 were obtained.

With respect to a circuit board which was prepared by soldering a resistor of 10 kΩ between terminal and terminal on a board for evaluation and treating the board for insulation according to the method employed in Example 12, an insulation resistance test was carried out which gave same test results as obtained in Example 12. No problem was found in respect of either insulating performance or exterior appearance. There was no burn-out problem with respect to the soldered resistor or the like. It was thus found that the method of the present invention would be applicable to circuit boards which had been loaded with devices.

Among Examples 9 to 12, Example 12 is considered to be most preferred Example because it demonstrates most favorable insulation performance.

EXAMPLE 13

A copper plate having a one side length of 5 cm and a thickness of 0.5 mm was completely immersed in a solution (liquid temperature: room temperature (24° C.)) comprising 5 parts by weight of o-aminobenzoic acid dissolved in 100 parts by weight of isopropyl alcohol, and was allowed to stand for 10 minutes. Then, the copper plate was subjected to dip-cleaning with isopropyl alcohol for 10 minutes. Thereafter, the copper plate was taken out to allow the isopropyl alcohol to be naturally eliminated at room temperature.

The copper plate was observed by a transmission-type electron microscope (hereinafter referred to as "TEM") for observing thickness and the like of the formed layer. For the purpose of evaluating heat resistance of the formed layer, the copper plate was heat-treated at 200° C. for 30 minutes. Measurement was made of a copper plate before and after heat treatment by a Fourier transformation infrared spectrometry (hereinafter referred to as "FT-IR").

As a result, it was found that on the heat treated copper plate there were a monomolecular layer having a uniform thickness of 4 to 5 nm and, on the layer, a layer having a thickness of about 300 nm which was comprised of molecules not bonded to the substrate.

In FT-TR spectrum, there was no change in signal intensity at 1620 cm$^{-1}$ and 1390 cm$^{-1}$ between the reading before heat treatment and the reading after heat treatment. The signal at 1620 cm$^{-1}$ shows the existence of a CuO—O—C bond, and the signal at 1390 cm$^{-1}$ shows the existence of a Cu—N—C bond. This tells that heat treatment of the copper plate did not cause layer peel from the substrate metal. Therefore, it can be understood that the formed layer has high heat resistance.

EXAMPLE 14

A copper plate having a one side length of 5 cm and a thickness of 0.5 mm was completely immersed in a solution (liquid temperature(room temperature (24° C.))) comprising 5 parts by weight of o-aminobenzoic acid dissolved in 100 parts by weight of isopropyl alcohol, and was allowed to stand for 10 minutes. Then, the copper plate was subjected to dip-cleaning with isopropyl alcohol for 10 minutes. Thereafter, the copper plate was taken out to allow isopropyl alcohol to be naturally eliminated at room temperature. The resulting layer was evaluated in the same way as in Example 13.

As a result, a monomolecular layer having a uniform thickness of 4 to 5 nm was found on the copper plate. Any such molecule not bonded to the substrate as observed in Example 13 was not found.

In ET-TR spectrum, there was little or no change in signal intensity at 1620 cm$^{-1}$ and 1390 cm$^{-1}$ between the reading before heat treatment and the reading after heat treatment. Therefore, it can be understood that the formed layer has high heat resistance.

COMPARATIVE EXAMPLE 7

A copper plate having a one side length of 5 cm and a thickness of 0.5 mm was completely immersed in a solution (liquid temperature(24° C. (room temperature))) comprising 5 parts by weight of acetic acid dissolved in 100 parts by weight of isopropyl alcohol, and was allowed to stand for 10 minutes. Then, the copper plate was subjected to dip-cleaning with isopropyl alcohol for 10 minutes. Thereafter, the copper plate was taken out to allow the isopropyl alcohol to be naturally eliminated at room temperature.

The copper plate was observed by means of TEM.

It was found that on the copper plate there was formed a monomolecular layer which was very ununiform.

The layer was then subjected to heat treatment at 200° C. for 30 minutes. Measurement was made by FT-IR with respect to a copper plate prior to heat treatment and the heat treated copper plate.

It was found that the 1620 cm$^{-1}$ signals indicating the existence of Cu—O—C bond and the 1390 cm$^{-1}$ signals indicating the presence of Cu—N—C had disappeared almost entirely. This tells that the heat resistance of the layer obtained was very low.

Therefore, it can be understood that a monomolecular layer in accordance with the present invention is strongly bonded to substrate metal and has high heat resistance. Further, by removing molecules which remain unbonded to the base metal it is possible to obtain a higher-performance layer having good endurance.

EXAMPLE 15

On a glass plate having a one side length of 50 mm and a thickness of 500 μm, with nickel vapor-deposited thereon to 100 nm, was formed a thin layer in the same way as in Example 14 by using a solution (liquid temperature(24° C. (room temperature))) comprising 5 parts by weight of 4-tetradecyl-N-methylsalicylaldehyde oxime dissolved in 100 parts by weight of toluene. The angle of contact of the thin layer with water was 92 degrees, showing improvement in water repellency as compared with 45 degrees, the angle of contact prior to layer formation. The layer formation was thus verified. The thickness of the layer, as measured by an ellipsoid meter (with layer refractive index set at 1.47), was 1.9 nm. The measurement witnessed that the layer was a monomolecular layer formed on a nickel surface.

EXAMPLE 16

On an acrylic plate having a one side length of 30 mm and a thickness of 1 mm and incorporating 1% by weight of cobalt fine particles by kneading was formed a thin layer in the same way as in Example 14 by using a solution (liquid temperature(24° C. (room temperature))) comprising 5 parts by weight of 3-tetradecylpyridine dissolved in 100 parts by weight of methanol. The angle of contact of the thin layer with water was 83 degrees, showing improvement in water repellency as compared with 65 degrees or the angle of contact prior to layer formation. The layer formation was thus verified.

EXAMPLE 17

A copper plate having a one side length of 3 cm and a thickness of 1 mm was completely immersed in a solution (liquid temperature(room temperature (24° C.))) comprising 5 parts by weight of an anthranilic acid derivative represented by the following formula (6):

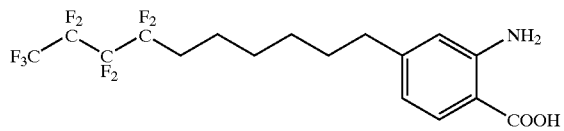

(6)

dissolved in 100 parts by weight of fluorine-based solvent (KF994; made by Sinetsu Kagaku Kogyo K. K.), and was allowed to stand for 15 minutes. Then, the copper plate was subjected to dip-cleaning with aforesaid fluorine-based solvent for 10 minutes. Thereafter, the copper plate was taken out to allow the fluorine-based solvent to be naturally eliminated at room temperature. The resulting layer was evaluated in the same way as in Example 1.

As a result, a monomolecular layer having a uniform thickness of 4 to 5 nm was found on the copper plate. Any such molecule not bonded to the substrate as observed in Example 13 was not found.

In FT-TR spectrum, there was little or no change in signal intensity at 1620 cm$^{-1}$ and 1390 cm$^{-1}$ between the reading before heat treatment and the reading after heat treatment. Therefore, it can be understood that the formed layer has high heat resistance.

The volume resistivity of the copper substrate on which the monomolecular layer was formed was calculated on the basis of the relevant current-voltage measurement data. The calculation gives a volume resistivity value of $1 \times 10^3$ Ωcm.

The present invention is based on Japanese Patent Application No. 8-34987 (filed on Dec. 27, 1996) and Japanese Patent Application No. 8-149227 (filed on Jun. 11, 1996).

What is claimed is:

1. A functional member comprising a substrate and a molecular layer on the surface of the substrate, wherein the molecular layer is formed through a coordinate bond with a metallic atom of the substrate, and the coordinate bond is a multidentate bond in which at least one molecule of the molecular layer is bonded to one metallic atom of the substrate and two or more ligands of the molecule coordinate to the metallic atoms of the substrate.

2. The functional member as set forth in claim 1, wherein the multidentate bond comprises a bond expressed by the following formula (1):

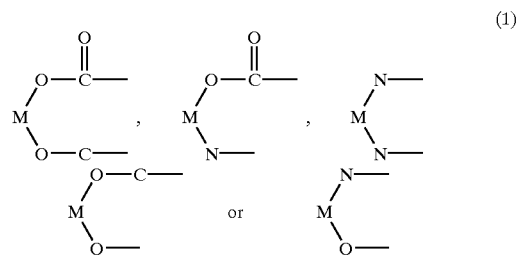

(1)

wherein M represents a metallic atom of the substrate.

3. The functional member as set forth in claim 2, wherein the molecular layer is a monomolecular layer.

4. The functional member as set forth in claim 2, wherein the molecular layer comprises a molecule having a functional group represented by the following formula (2):

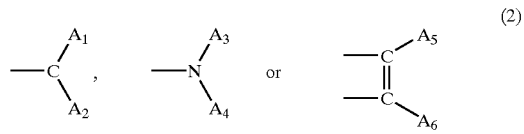

(2)

wherein $A_1$–$A_6$ represent (a) $(CH_2)_n COOH$, wherein n is 0–3, (b) $(CH_2)_n OH$, wherein n is 0–3, or (c) $(CH_2)_m NXY$ wherein m is 0–2, and X and Y respectively represent a hydrogen atom, a hydrocarbon group having not more than 8 carbon atoms, a phenyl group, or an aromatic ring group having one or more hydrocarbon groups having not more than 8 carbon atoms, and the double bond may be a part of a benzene ring or other aromatic ring.

5. The functional member as set forth in claim 4, wherein the molecular layer is a monomolecular layer.

6. The functional member as set forth in claim 1, wherein the molecular layer comprises a molecule having a functional group represented by the following formula (2):

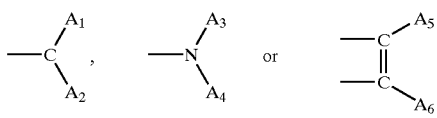

wherein $A_1$–$A_6$ represent (a) $(CH_2)_n COOH$ wherein n is 0–3, (b) $(CH_2)_n OH$, wherein n is 0–3, or (c) $(CH_2)_m NXY$ wherein m is 0–2, and X and Y respectively represent a hydrogen atom, a hydrocarbon group having not more than 8 carbon atoms, a phenyl group, or an aromatic ring group having one or more hydrocarbon groups having not more than 8 carbon atoms, and the double bond may be a part of a benzene ring or other aromatic ring.

7. The functional member as set forth in claim 6, wherein the molecular layer is a monomolecular layer.

8. The functional member as set forth in claim 1, wherein the molecular layer is a monomolecular layer.

9. A method of producing a functional member said functional member comprising a substrate and a molecular layer on the surface of the substrate, said method comprising bringing multidentate molecules into contact with metallic atoms of the substrate to cause the multidentate molecules to coordinate on the metallic atoms of the substrate.

10. The method of producing a functional member as set forth in claim 9, further comprising removing multidentate molecules which do not coordinate on the metallic atoms of the substrate.

11. The method of producing a functional member as set forth in claim 10, wherein the molecular layer is a monomolecular layer.

12. The method of producing a functional member as set forth in claim 10, wherein the multidentate molecules comprise a functional group represented by the following formula (2):

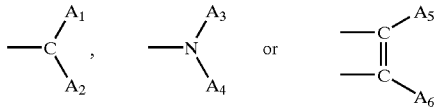

wherein $A_1$–$A_6$ represent (a) $(CH_2)_n COOH$, wherein n is 0–3, (b) $(CH_2)_n OH$, wherein n is 0–3, or (c) $(CH_2)_m NXY$ wherein m is 0–2, and X and Y respectively represent a hydrogen atom, a hydrocarbon group having not more than 8 carbon atoms, a phenyl group, or an aromatic ring group having one or more hydrocarbon groups having not more than 8 carbon atoms, and the double bond may be a part of a benzene ring or other aromatic ring.

13. The method of producing a functional member as set forth in claim 12, wherein the molecular layer is a monomolecular layer.

14. The method of producing a functional member as set forth in claim 9, wherein the multidentate molecules comprise a functional group represented by the following formula (2):

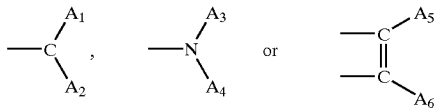

wherein $A_1$–$A_6$ represent (a) $(CH_2)_n COOH$ wherein n is 0–3, (b) $(CH_2)_n OH$, wherein n is 0–3, or (c) $(CH_2)_m NXY$ wherein m is 0–2, and X and Y respectively represent a hydrogen atom, a hydrocarbon group having not more than 8 carbon atoms, a phenyl group, or an aromatic ring group having one or more hydrocarbon groups having not more than 8 carbon atoms, and the double bond may be a part of a benzene ring or other aromatic ring.

15. The method of producing a functional member as set forth in claim 14, wherein the molecular layer is a monomolecular layer.

16. The method of producing a functional member as set forth in claim 9, wherein the molecular layer is a monomolecular layer.

17. The functional member as set forth in claim 1, wherein the multidentate bond is derived from at least one of the compounds selected from the group consisting of acetylacetone, acetoethyl acetate, benzoyl acetone, ethylenediamine, diethylenetriamine, triethylenetetramine, diethylamine, thiourea, diethanolamine, triethanolamine, iminodiacetic acid, nitrilotriacetic acid, ethylenediamine tetraacetic acid, quinoline-8-carboxylic acid, quinaldinic acid, o-aminobenzoic acid, oxalic acid, malonic acid, succinic acid, adipic acid, maleic acid, fumaric acid, anthranilic acid, 2-aminoperimidine, galloylgallic acid, potassium xanthate, oxine, cupferron, 4-chloro-3-methyl-5-nitrobenzene sulfonate, salicylaldehyde oxime, diantipyrylmethane, diethyl dithiocarbamic acid, p-dimethylamino benzylidene rhodamine, dimethylglyoxime, cinchonine, N-cinnamoyl-N-phenylhydroxylamine, thioacetoamide, thionalide, tetraphenyl borate, trimethylphenyl ammonium, 1-nitroso-2-naphthol, nitrone, neocupferron, bismuthyol II, p-hydroxyphenyl arsonic acid, 8-hydroxy-7-iodo-5-quinoline sulfonic acid, pyrogallol, 1-pyrrolidine carbodithioic acid, phenylarsonic acid, (phenylthio) dantinic acid, phenylfluoron, α-furyldioxime, brucine, benzidine, N-benzoyl-N-phenylhydroxylamine, α-benzoin oxime, benzo[f] quinoline, 2-mercaptobenzothiazole, rhodamine B, 4-tetradecyl-N-methyl salicylaldehyde oxime, 3-tetradecyl pyridine, itaconic acid, pyromellitic acid, 4-pentylanthranilic acid, 2-heptafluoroethynyl itaconic acid, anthranilic acid incorporating an alkyl group of the C3–C22 order, itaconic acid incorporating an alkyl group of the C3–C22 order, pyromellitic acid incorporating an alkyl group of the C3–C22 order, anthranilic acid incorporating a fluoroalkyl group of the C1–C18 order, itaconic acid incorporating a fluoroalkyl group of the C1–C18 order, anthranilic acid incorporating a t-butyl group, itaconic acid incorporating a t-butyl group, anthranilic acid incorporating a polycyclic aromatic group, and itaconic acid incorporating a polycyclic aromatic group.

18. The functional member as set forth in claim 1, wherein the substrate comprises at least one metal selected from the group consisting of copper, nickel, cobalt, silver, gold, platinum, aluminium and tungsten.

19. The method of producing a functional member as set forth in claim 5, wherein the multidentate bond is derived from at least one of the compounds selected from the group consisting of acetylacetone, acetoethyl acetate, benzoyl acetone, ethylenediamine, diethylenetriamine, triethylenetetramine, diethylamine, thiourea, diethanolamine, triethanolamine, iminodiacetic acid, nitrilotriacetic acid, ethylenediamine tetraacetic acid, quinoline-8-carboxylic acid, quinaldinic acid, o-aminobenzoic acid, oxalic acid, malonic acid, succinic acid, adipic acid, maleic acid, fumaric acid, anthranilic acid, 2-aminoperimidine, galloylgallic acid, potassium xanthate, oxine, cupferron, 4-chloro-3-methyl-5-nitrobenzene sulfonate, salicylaldehyde oxime, diantipyrylmethane, diethyl dithiocarbamic acid, p-dimethylamino benzylidene rhodamine, dimethylglyoxime, cinchonine, N-cinnamoyl-N-phenylhydroxylamine, thioacetoamide, thionalide, tetraphenyl borate, trimethylphenyl ammonium, 1-nitroso-2-naphthol, nitrone, neocupferron, bismuthyol II, p-hydroxyphenyl arsonic acid, 8-hydroxy-7-iodo-5-quinoline sulfonic acid, pyrogallol, 1-pyrrolidine carbodithioic acid, phenylarsonic acid, (phenylthio) dantinic acid, phenylfluoron, α-furyldioxime, brucine, benzidine, N-benzoyl-N-phenylhydroxylamine, α-benzoin oxime, benzo[f] quinoline, 2-mercaptobenzothiazole, rhodamine B, 4-tetradecyl-N-methyl salicylaldehyde oxime, 3-tetradecyl pyridine, itaconic acid, pyromellitic acid, 4-pentylanthranilic acid, 2-heptafluoroethynyl itaconic acid, anthranilic acid incorporating an alkyl group of the C3–C22 order, itaconic acid incorporating an alkyl group of the C3–C22 order, pyromellitic acid incorporating an alkyl group of the C3–C22 order, anthranilic acid incorporating a fluoroalkyl group of the C1–C18 order, itaconic acid incorporating a fluoroalkyl group of the C1–C18 order, anthranilic acid incorporating a t-butyl group, itaconic acid incorporating a t-butyl group, anthranilic acid incorporating a polycyclic aromatic group, and itaconic acid incorporating a polycyclic aromatic group.

20. The method of producing a functional member as set forth in claim 5, wherein the substrate comprises at least one metal selected from the group consisting of copper, nickel, cobalt, silver, gold, platinum, aluminium and tungsten.

21. The method of producing a functional member as set forth in claim 6, wherein the multidentate bond is derived from at least one of the compounds selected from the group consisting of acetylacetone, acetoethyl acetate, benzoyl acetone, ethylenediamine, diethylenetriamine, triethylenetetramine, diethylamine, thiourea, diethanolamine, triethanolamine, iminodiacetic acid, nitrilotriacetic acid, ethylenediamine tetraacetic acid, quinoline-8-carboxylic acid, quinaldinic acid, o-aminobenzoic acid, oxalic acid, malonic acid, succinic acid, adipic acid, maleic acid, fumaric acid, anthranilic acid, 2-aminoperimidine, galloylgallic acid, potassium xanthate, oxine, cupferron, 4-chloro-3-methyl-5-nitrobenzene sulfonate, salicylaldehyde oxime, diantipyrylmethane, diethyl dithiocarbamic acid, p-dimethylamino benzylidene rhodamine, dimethylglyoxime, cinchonine, N-cinnamoyl-N-phenylhydroxylamine, thioacetoarnide, thionalide, tetraphenyl borate, trimethylphenyl ammonium, 1-nitroso-2-naphthol, nitrone, neocupferron, bismuthyol II, p-hydroxyphenyl arsonic acid, 8-hydroxy-7-iodo-5-quinoline sulfonic acid, pyrogallol, 1-pyrrolidine carbodithioic acid, phenylarsonic acid, (phenylthio) dantinic acid, phenylfluoron, α-furyldioxime, brucine, benzidine, N-benzoyl-N-phenylhydroxylamine, α-benzoin oxime, benzo[f] quinoline, 2-mercaptobenzothiazole, rhodamine B, 4-tetradecyl-N-methyl salicylaldehyde oxime, 3-tetradecyl pyridine, itaconic acid, pyromellitic acid, 4-pentylanthranilic acid, 2-heptafluoroethynyl itaconic acid, anthranilic acid incorporating an alkyl group of the C3–C22 order, itaconic acid incorporating an alkyl group of the C3–C22 order, pyromellitic acid incorporating an alkyl group of the C3–C22 order, anthranilic acid incorporating a fluoroalkyl group of the C1–C18 order, itaconic acid incorporating a fluoroalkyl group of the C1–C18 order, anthranilic acid incorporating a t-butyl group, itaconic acid incorporating a t-butyl group, anthranilic acid incorporating a polycyclic aromatic group, and itaconic acid incorporating a polycyclic aromatic group.

22. The method of producing a functional member as set forth in claim 6, wherein the substrate comprises at least one metal selected from the group consisting of copper, nickel, cobalt, silver, gold, platinum, aluminium and tungsten.

23. The method of producing a functional member as set forth in claim 7, wherein the multidentate bond is derived from at least one of the compounds selected from the group consisting of acetylacetone, acetoethyl acetate, benzoyl acetone, ethylenediamine, diethylenetriamine, triethylenetetramine, diethylamine, thiourea, diethanolamine, triethanolamine, iminodiacetic acid, nitrilotriacetic acid, ethylenediamine tetraacetic acid, quinoline-8-carboxylic acid, quinaldinic acid, o-aminobenzoic acid, oxalic acid, malonic acid, succinic acid, adipic acid, maleic acid, fumaric acid, anthranilic acid, 2-aminoperimidine, galloylgallic acid, potassium xanthate, oxine, cupferron, 4-chloro-3-methyl-5-nitrobenzene sulfonate, salicylaldehyde oxime, diantipyrylmethane, diethyl dithiocarbamic acid, p-dimethylamino benzylidene rhodamine, dimethylglyoxime, cinchonine, N-cinnamoyl-N-phenylhydroxylamine, thioacetoamide, thionalide, tetraphenyl borate, trimethylphenyl ammonium, 1-nitroso-2-naphthol, nitrone, neocupferron, bismuthyol II, p-hydroxyphenyl arsonic acid, 8-hydroxy-7-iodo-5-quinoline sulfonic acid, pyrogallol, 1-pyrrolidine carbodithioic acid, phenylarsonic acid, (phenylthio) dantinic acid, phenylfluoron, α-furyldioxime, brucine, benzidine, N-benzoyl-N-phenylhydroxylamine, α-benzoin oxime, benzo[f] quinoline, 2-mercaptobenzothiazole, rhodamine B, 4-tetradecyl-N-methyl salicylaldehyde oxime, 3-tetradecyl pyridine, itaconic acid, pyromellitic acid, 4-pentylanthranilic acid, 2-heptafluoroethynyl itaconic acid, anthranilic acid incorporating an alkyl group of the C3–C22 order, itaconic acid incorporating an alkyl group of the C3–C22 order, pyromellitic acid incorporating an alkyl group of the C3–C22 order, anthranilic acid incorporating a fluoroalkyl group of the C1–C18 order, itaconic acid incorporating a fluoroalkyl group of the C1–C18 order, anthranilic acid incorporating a t-butyl group, itaconic acid incorporating a t-butyl group, anthranilic acid incorporating a polycyclic aromatic group, and itaconic acid incorporating a polycyclic aromatic group.

24. The method of producing a functional member as set forth in claim 7, wherein the substrate comprises at least one metal selected from the group consisting of copper, nickel, cobalt, silver, gold, platinum, aluminium and tungsten.

25. The functional member as set forth in claim 2, wherein the multidentate bond is derived from at least one of the compounds selected from the group consisting of acetylacetone, acetoethyl acetate, benzoyl acetone, ethylenediamine, diethylenetriamine, triethylenetetramine, diethylamine, thiourea, diethanolamine, triethanolamine, iminodiacetic acid, nitrilotriacetic acid, ethylenediamine tetraacetic acid, quinoline-8-carboxylic acid, quinaldinic acid, o-aminobenzoic acid, oxalic acid, malonic acid, succinic acid, adipic acid, maleic acid, fumaric acid, anthranilic acid, 2-aminoperimidine, galloylgallic acid, potassium xanthate, oxine, cupferron, 4-chloro-3-methyl-5-nitrobenzene sulfonate, salicylaldehyde oxime, diantipyrylmethane, diethyl dithiocarbamic acid, p-dimethylamino benzylidene rhodamine, dimethylglyoxime, cinchonine, N-cinnamoyl-N-phenylhydroxylamine, thioacetoamide, thionalide, tetraphenyl borate, trimethylphenyl ammonium, 1-nitroso-2-naphthol, nitrone, neocupferron, bismuthyol II, p-hydroxyphenyl arsonic acid, 8-hydroxy-7-iodo-5-quinoline sulfonic acid, pyrogallol, 1-pyrrolidine carbodithioic acid, phenylarsonic acid, (phenylthio) dantinic acid, phenylfluoron, α-furyldioxime, brucine, benzidine, N-benzoyl-N-phenylhydroxylamine, α-benzoin oxime, benzo[f] quinoline, 2-mercaptobenzothiazole, rhodamine B, 4-tetradecyl-N-methyl salicylaldehyde oxime, 3-tetradecyl pyridine, itaconic acid, pyromellitic acid, 4-pentylanthranilic acid, 2-heptafluoroethynyl itaconic acid, anthranilic acid incorporating an alkyl group of the C3–C22 order, itaconic acid incorporating an alkyl group of the C3–C22 order, pyromellitic acid incorporating an alkyl group of the C3–C22 order, anthranilic acid incorporating a fluoroalkyl group of the C1–C18 order, itaconic acid incorporating a fluoroalkyl group of the C1–C18 order, anthranilic acid incorporating a t-butyl group, itaconic acid incorporating a t-butyl group, anthranilic acid incorporating a polycyclic aromatic group, and itaconic acid incorporating a polycyclic aromatic group.

26. The functional member as set forth in claim 2, wherein the substrate comprises at least one metal selected from the group consisting of copper, nickel, cobalt, silver, gold, platinum, aluminium and tungsten.

27. The functional member as set forth in claim 3, wherein the multidentate bond is derived from at least one of the compounds selected from the group consisting of acetylacetone, acetoethyl acetate, benzoyl acetone, ethylenediamine, diethylenetriamine, triethylenetetramine, diethylamine, thiourea, diethanolamine, triethanolamine, iminodiacetic acid, nitrilotriacetic acid, ethylenediamine tetraacetic acid, quinoline-8-carboxylic acid, quinaldinic acid, o-aminobenzoic acid, oxalic acid, malonic acid, succinic acid, adipic acid, maleic acid, fumaric acid, anthranilic acid, 2-aminoperimidine, galloylgallic acid, potassium xanthate, oxine, cupferron, 4-chloro-3-methyl-5-nitrobenzene sulfonate, salicylaldehyde oxime, diantipyrylmethane, diethyl dithiocarbamic acid, p-dimethylamino benzylidene rhodamine, dimethylglyoxime, cinchonine, N-cinnamoyl-N-phenylhydroxylamine, thioacetoamide, thionalide, tetraphenyl borate, trimethylphenyl ammonium, 1-nitroso-2-naphthol, nitrone, neocupferron, bismuthyol II, p-hydroxyphenyl arsonic acid, 8-hydroxy-7-iodo-5-quinoline sulfonic acid, pyrogallol, 1-pyrrolidine carbodithioic acid, phenylarsonic acid, (phenylthio) dantinic acid, phenylfluoron, α-furyldioxime, brucine, benzidine, N-benzoyl-N-phenylhydroxylamine, α-benzoin oxime, benzo[f] quinoline, 2-mercaptobenzothiazole, rhodamine B, 4-tetradecyl-N-methyl salicylaldehyde oxime, 3-tetradecyl pyridine, itaconic acid, pyromellitic acid, 4-pentylanthranilic acid, 2-heptafluoroethynyl itaconic acid, anthranilic acid incorporating an alkyl group of the C3–C22 order, itaconic acid incorporating an alkyl group of the C3–C22 order, pyromellitic acid incorporating an alkyl group of the C3–C22 order, anthranilic acid incorporating a fluoroalkyl group of the C1–C18 order, itaconic acid incorporating a fluoroalkyl group of the C1–C 18 order, anthranilic acid incorporating a t-butyl group, itaconic acid incorporating a t-butyl group, anthranilic acid incorporating a polycyclic aromatic group, and itaconic acid incorporating a polycyclic aromatic group.

28. The functional member as set forth in claim 3, wherein the substrate comprises at least one metal selected from the group consisting of copper, nickel, cobalt, silver, gold, platinum, aluminium and tungsten.

29. The functional member as set forth in claim 17, wherein the molecular layer is a monomolecular layer.

30. The functional member as set forth in claim 18, wherein the molecular layer is a monomolecular layer.

31. The method of producing a functional member as set forth in claim 19, wherein the molecular layer is a monomolecular layer.

32. The method of producing a functional member as set forth in claim 20, wherein the molecular layer is a monomolecular layer.

33. The method of producing a functional member as set forth in claim 21, wherein the molecular layer is a monomolecular layer.

34. The method of producing a functional member as set forth in claim 22, wherein the molecular layer is a monomolecular layer.

35. The method of producing a functional member as set forth in claim 23, wherein the molecular layer is a monomolecular layer.

36. The method of producing a functional member as set forth in claim 24, wherein the molecular layer is a monomolecular layer.

37. The functional member as set forth in claim 25, wherein the molecular layer is a monomolecular layer.

38. The functional member as set forth in claim 26, wherein the molecular layer is a monomolecular layer.

39. The functional member as set forth in claim 27, wherein the molecular layer is a monomolecular layer.

40. The functional member as set forth in claim 28, wherein the molecular layer is a monomolecular layer.

* * * * *

UNITED STATES PATENT AND TRADEMARK OFFICE
CERTIFICATE OF CORRECTION

PATENT NO. : 6,495,247 B1  Page 1 of 1
DATED : December 17, 2002
INVENTOR(S) : Hiroaki Takezawa et al.

It is certified that error appears in the above-identified patent and that said Letters Patent is hereby corrected as shown below:

Title Page,
Item [86], §371 (c)(1), (2), (4) Date:, change "Aug. 21, 1999" to -- Aug. 21, 1998 --.
Item [56], References Cited, please add the following:
--          U.S. PATENT DOCUMENTS
5,397,642     3/1995     Li et al. ……………….. 428/403
5,536,577     7/1996     Murayama et al. ……….. 428/408 --.

Column 3,
Line 42, change "below is it" to -- below, it is --.

Column 6,
Line 26, change "elated" to -- eluted --.
Line 49, change "a-benzoin oxime," to -- α-benzoin oxime --.

Column 7,
Lines 35, 38 and 40, delete "." after "100º C".

Column 14,
Lines 14 and 41, change "ET-TR" to -- FT-IR --.

Column 19,
Line 44, change "thioacetoarnide" to -- thioacetoamide --.

Signed and Sealed this

Tenth Day of February, 2004

JON W. DUDAS
*Acting Director of the United States Patent and Trademark Office*